United States Patent [19]
Copp

[11] 3,773,968
[45] Nov. 20, 1973

[54] ELECTRICAL JUNCTION AND SWITCH BOXES

[75] Inventor: Donald G. Copp, Mantua, Ohio

[73] Assignee: Indian Head Inc., New York, N.Y.

[22] Filed: Apr. 12, 1972

[21] Appl. No.: 243,317

[52] U.S. Cl.................... 174/53, 174/58, 220/3.9, 220/27
[51] Int. Cl............................................. H02g 3/12
[58] Field of Search.................... 174/53, 58, 65; 220/27, 89 A, 3.9, 3.6, 3.2

[56] References Cited
UNITED STATES PATENTS

| | | | |
|---|---|---|---|
| 2,959,633 | 11/1960 | Palmer et al.................. | 174/53 UX |
| 3,410,582 | 11/1968 | Appleton.......................... | 174/65 R |
| 3,040,926 | 6/1962 | Palmer............................. | 174/58 X |
| 3,214,126 | 10/1965 | Roos............................... | 220/3.9 X |
| 1,121,291 | 12/1914 | Robinson......................... | 220/27 X |
| 2,352,913 | 7/1944 | Parker............................. | 174/53 X |

Primary Examiner—Bernard A. Gilheany
Assistant Examiner—D. A. Tone
Attorney—Joseph C. Kotaraski et al.

[57] ABSTRACT

A box for mounting in walls and ceilings for the purpose of enclosing the ends of electrical cables or conduits, and providing access to terminals or contacts connected to the ends of the cables or conduits through a switch plate or socket secured to one side of the box. The box is constructed of molded, synthetic resin and is characterized in having a pry-out panel assembly disposed between two walls of the box. Each pry-out panel assembly is located in a plane extending at an angle of from about 30° to about 60° to the planes of the walls of the box between which the assembly is located. Each pry-out panel assembly includes a plurality of elongated ribs of right triangular cross-section, with the base of the triangle lying in a plane extending at an angle of 30° to 60° to the plane of at least one wall of the box, and defining an open slot into the box between the ribs. At least one bridge web connects the triangular cross-sectioned ribs to the remainder of the box.

15 Claims, 9 Drawing Figures

PATENTED NOV 20 1973 3,773,968
SHEET 1 OF 2
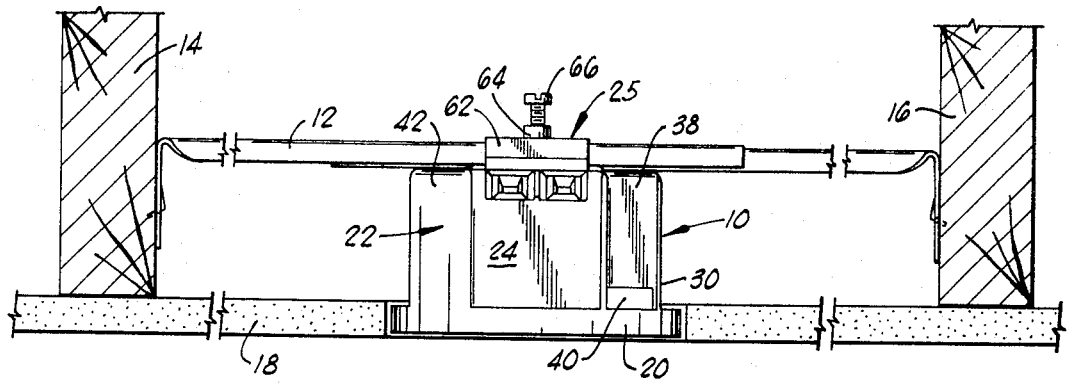
FIG. 1
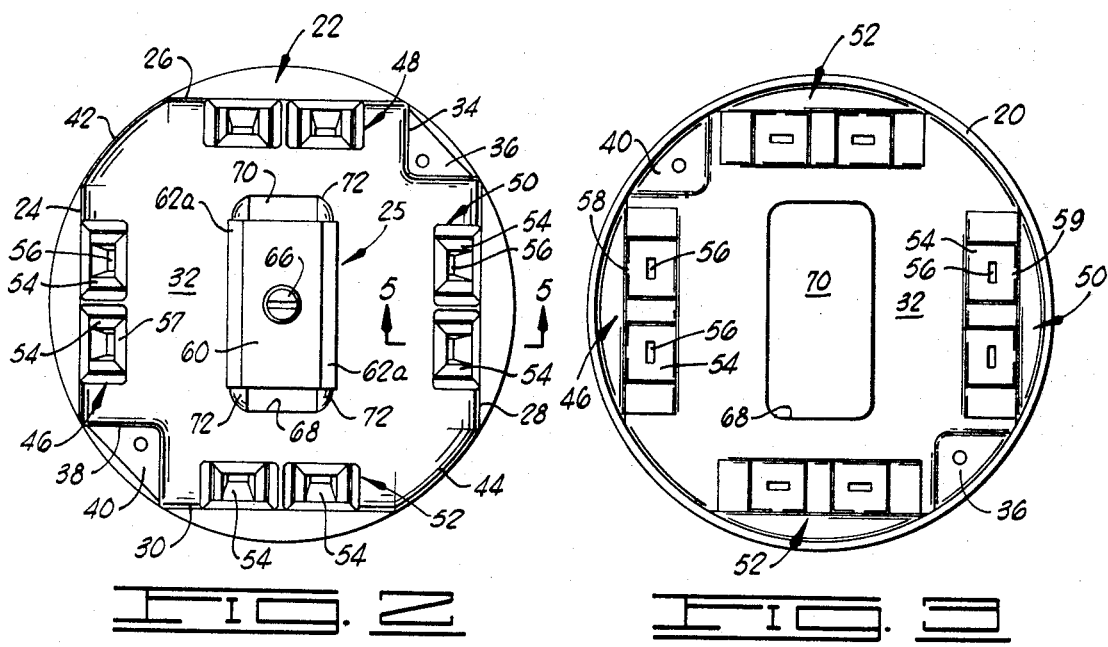
FIG. 2          FIG. 3
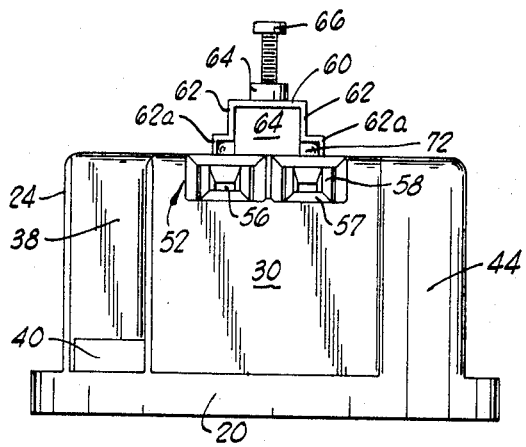        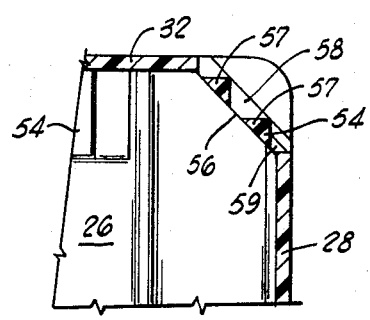
FIG. 4          FIG. 5

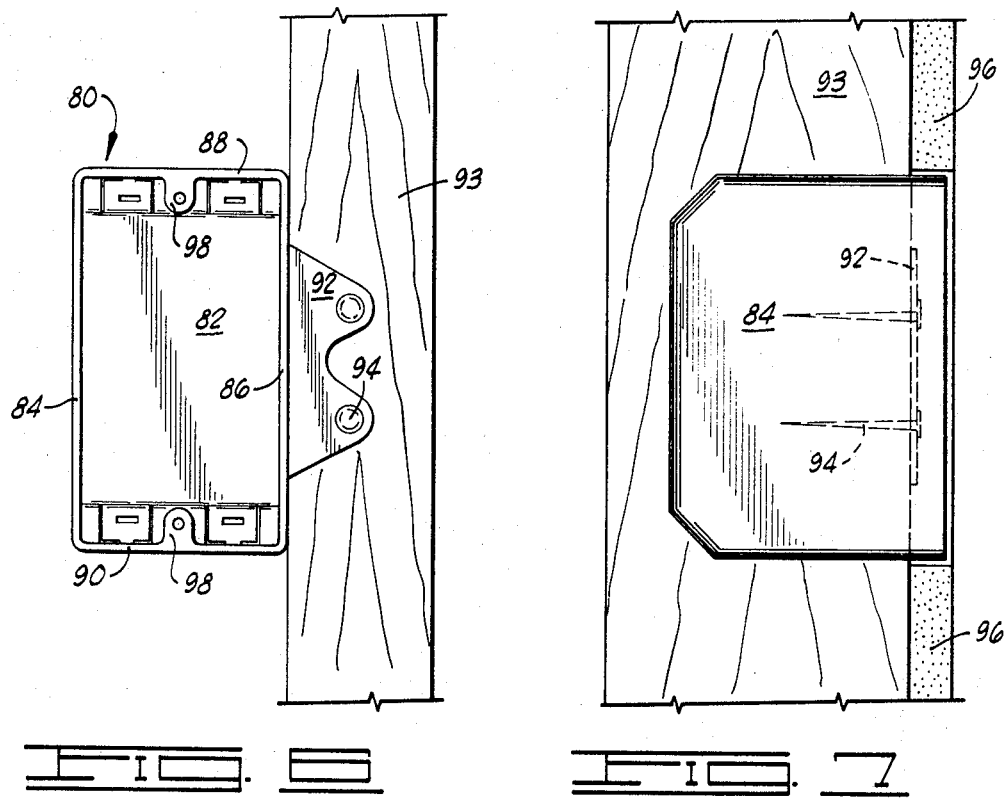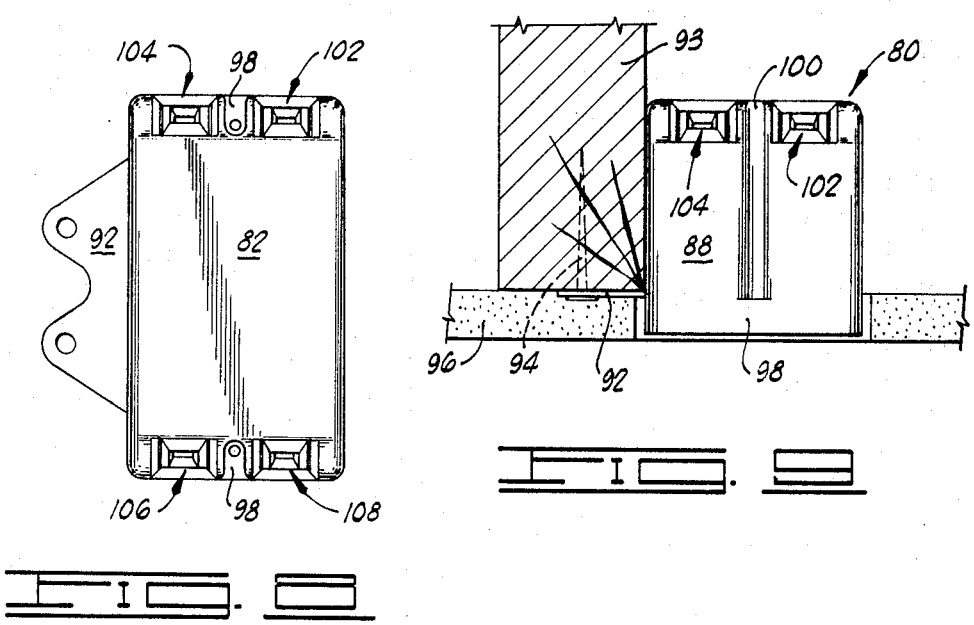

ELECTRICAL JUNCTION AND SWITCH BOXES

BACKGROUND OF THE INVENTION

1. Field of the Invention

This invention relates to improved, synthetic resin electrical junction and switch boxes which can be formed by a single step, straight draw molding process, and which includes novel pry-out panels.

2. Brief Description of the Prior Art

Electrical junction and switch boxes or receptacles for providing accessibility to electrical service, or control of electrical service, through appropriate sockets, switch plates or quick detachable circuit-making connections are well known in the art and are widely used. These boxes are mounted in walls and ceilings during the construction of buildings to provide ready access to electrical service. In recent years, some of the boxes of the type described have been constructed of synthetic resin. The plastic boxes are lighter, safer and can be more economically constructed than the metal boxes made by older methods of fabrication.

In the manufacture of synthetic resin electrical boxes, it has usually been necessary to use complicated molds and multi-step procedures in forming the boxes in order to provide the necessary access openings to permit electrical leads to be passed through the walls or top of the boxes and connected to suitable terminals or contacts on the interior thereof. In general, the openings through the walls of the box are provided by forming the box with a plurality of pry-out or knock-out panels therein, and these are then removed by the use of a screwdriver, or other suitable implement, to provide an aperture of sufficient size to receive the electrical leads to be employed. Difficulty is experienced in many cases in extending leads from the inside of the box to the outside thereof where the openings have been provided in the side walls of the box. Where the leads are to be run from the outside to the inside of the box, it is not an infrequent experience to find a knock-out panel inappropriately located to facilitate the greatest ease in extending the lead into the box.

BRIEF DESCRIPTION OF THE PRESENT INVENTION

Broadly described, the electrical junction and switch boxes of the invention comprise a housing constructed of a synthetic resin which is preferably polyvinyl chloride. The housing is formed as an integrally molded unit, and includes a plurality of side walls and a top wall extending substantially normal to and intersecting the side walls. At the intersection of the top wall with one or more of the side walls, a pry-out panel assembly is formed as an integral portion of the box, and lies generally in a plane which extends at an angle of from about 30° to about 60° with respect to the top wall and the respective side wall between which it is located. The pry-out panel includes a plurality of right triangularly cross-sectioned ribs which are connected to the remainder of box through at least one thin, frangible bridge web.

An object of the invention is to provide an integrally molded unitary electrical switch or junction box which can be formed by a one-step, straight draw molding process.

An additional object of the invention is to provide a structurally strong switch or junction box which is characterized in having a long and trouble free operating life.

A further object of the invention is to provide an electrical switch or junction box which has pry-out panel assemblies formed thereon at a location such that openings may be formed into the box in an orientation with respect to the side and top walls thereof so that electrical conduits or cables may be easily passed into or out of the interior of the box.

Additional objects and advantages will become apparent as the following detailed description of the invention is read in conjunction with the accompanying drawings which illustrate certain preferred embodiments of the invention.

BRIEF DESCRIPTION OF THE DRAWINGS

FIG. 1 is a sectional view through a ceiling, illustrating in elevation one type of electrical box constructed in accordance with the present invention as the box is operatively mounted between ceiling structural members.

FIG. 2 is a top plan view of the box shown in FIG. 1.

FIG. 3 is a bottom plan view of the electrical box.

FIG. 4 is a side elevation view of the electrical box.

FIG. 5 is a sectional view taken along line 5—5 of FIG. 2.

FIG. 6 is a front elevation view of a wall mounted switch box constructed in accordance with the present invention and secured in position on a wall stud.

FIG. 7 is a side elevation view of the switch box shown in FIG. 6 and showing also a sheet rock panel secured to the stud.

FIG. 8 is a rear elevation view of the switch box.

FIG. 9 is a plan view of the structure shown in FIG. 7.

DETAILED DESCRIPTION OF A PREFERRED EMBODIMENT OF THE INVENTION

Referring initially in FIG. 1 of the drawings, a ceiling box constructed in accordance with the present invention is designated generally by reference numeral 10. The box 10 is supported by an extensible metal rod 12 which has its ends suitably secured to a pair of parallel ceiling joists 14 and 16. The box 10 is positioned so that the lower side of the box is flush with a panel 18 of sheet rock or the like used to form the ceiling. The panel 18 has a circular aperture dimensioned to receive a shallow cylindrical base portion 20 of the ceiling box 10.

The ceiling box further includes a housing or body portion 22 of generally right parallelepiped configuration and a hanger bracket 25. The housing 22 is formed integrally with the shallow cylindrical base portion 20 of the ceiling box, and includes four side walls 24, 26, 28 and 30. These side walls are connected at their upper side edges to an integrally formed top wall 32. At diagonally opposite corners of the housing 22, recesses or indentations are formed between the adjacent side walls. Thus, as shown in FIG. 2, a right triangular indentation 34 is formed between the side walls 26 and 28. Immediately above the shallow cylindrical base 20 of the box, a screw receiving lug 36 is formed at the bottom of the recess or indentation 34. In similar fashion, a recess or indentation 38 is formed between the side walls 24 and 30 on the opposite side of the box from the recess 34, and a screw receiving lug 40 is positioned in the bottom of this recess immediagely above the shallow cylindrical base 20. At its other two corners, the housing 22 is radiused between the adjacent side walls so as to include arcuate portions 42 and 44 formed on the same radius as the shallow cylindrical base 20.

At the intersections of the top wall 32 with the several side walls 24, 26, 28 and 30, a pry-out panel assembly is provided, and each of these assemblies lies in a plane extending at an angle of from 30° to 60°, and preferably 45°, with respect to the top wall and side wall between which the respective pry-out panel is located. Thus, between the side wall 24 and the top wall 32, a pry-out panel assembly designated generally by reference numeral 46 is provided, and identically constructed pry-out panel assemblies 48, 50 and 52 are positioned at the intersections of the side walls 26, 28 and 30, respectively, with the top wall 32. Each pry-out panel assembly includes a pry-out tab 54 which is centrally slotted, as at 56, to receive the point of a screwdriver or similar implement.

In the illustrated embodiment, each tab 54 includes two parallel ribs 7 of right triangular cross-section which are disposed on opposite sides of the slot 56, and two other parallel ribs 58 of triangular cross-section which are integrally formed with the ribs 57 and define therewith a rectangular enclosure surrounding the slot 56. It is important that the bases of the several triangular ribs 57 and 58 lie in a plane which extends at an angle of from 30° to 60° with respect to the adjacent top and side walls of the box, and that the other two sides of each rib 57 extend, in one case, parallel to the plane of the adjacent side wall of the box, and in the case of the other side of the rib, substantially perpendicular to the adjacent side wall of the box. This allows the pry-out panel assemblies to be formed by a straight draw molding procedure, and without the use of side cores.

At least one bridge web 59 bridges between and interconnects the side wall or top wall of the box with at least one of the ribs 57. One of these bridge webs 59 is most clearly illustrated in FIG. 5. The bridge webs 59 are formed by milling gates in an edge of the cavity of the mold to allow the synthetic resin to flow into the rib void from the side wall void between the mold core and mold cavity. The bridge webs 59 function to retain the tabs 54 in position until they are pried out with a screwdriver or the like preparatory to using the box.

The hanger bracket assembly 25 is generally U-shaped in cross-sectional configuration, and includes a top panel 60 having a pair of downwardly depending leg panels 62 extending from opposite side edges thereof, and defining an elongated channel through the hanger bracket for receiving the extensible rod 12. The leg panels 62 each have horizontally offset portions 62a for accommodating ribs carried on the upper side of a closure plate as hereinafter described. Centrally positioned on the upper side of the top panel 60, and formed integrally therewith, is an internally threaded boss 64 which receives a set screw 66 used to engage the extensible rod 12 employed for mounting the ceiling box 10 in the manner shown in FIG. 1.

As the ceiling box 10 of the invention is manufactured using a straight draw molding process as hereinafter described, the box is initially formed with a relatively large aperture 68 formed through the top wall 32 immediately beneath the hanger bracket 25. For purposes of complying with certain electrical code requirements, once the ceiling box has been formed, the aperture at the location described is closed by means of a closure plate 70 which is fitted into the aperture 68. The closure plate 70 carries on its upper side, a pair of elongated, radiused ribs 72 which are positiond under the offset portions 62a of the leg panels 62 forming part of the hanger bracket 25.

In referring to FIG. 3 of the drawings, it will be noted that the screw receiving lugs 36 and 40 are accessible from the open bottom side of the ceiling box 10, and that suitable screws may be used for securing a female socket plate or other appropriate access plate to the bottom side of the ceiling box after it has been mounted in the ceiling in the manner shown in FIG. 1.

In the manufacture of the ceiling box of the present invention, the geometric configuration of the box which is characteristic thereof permits it to be quickly and easily formed by a straight draw molding process. In this process, a two-part mold is employed in which a male die or mold core reciprocates relative to a female die or mold cavity. The surfaces of the box are oriented such that all of them may be formed by this straight draw molding procedure, and it is not necessary to include any side coring mold parts in the molding procedure.

The formation of the pry-out panel assemblies 46–52 on angles of between 30° and 60°, and preferably 45°, with respect to the top wall 32 and the several side walls of the housing 22 permits this portion of the box to be formed by the straight draw molding process, and also facilitates the extension of electrical leads into or out of the interior of the ceiling box. When the pry-out tabs 54 have been removed by insertion of the point of a screwdriver through the apertures 56, and severance of the bridge webs 59 which retain these tabs in place, it is then very easy to extend an electrical conduit or cable from the inside of the ceiling box to the outside thereof by passing it through the opening or aperture thus formed which is located in a plane having the described angulation with respect to the top wall and side walls. A substantially greater difficulty would be experienced in thus extending the electrical conduits if the pry-out panel assemblies were formed either in the plane of the side walls, or in the top wall.

In FIGS. 6–9 of the drawings, there is illustrated a wall mounting switch box 80 constructed in accordance with the present invention. The switch box 80 is a unitary molded structure constructed of synthetic resin, and preferably made from polyvinyl chloride. The switch box 80 is of generally right parallelepiped configuration and includes a back wall 82, a pair of substantially parallel side walls 84 and 86, a top wall 88 and a bottom wall 90. As installed, the front side of the switch box 80 is open, and is adapted to receive a switch plate (not shown) which is secured to the switch box in a manner hereinafter described.

Projecting from one side wall 86 of the switch box 80, and extending normal thereto, is a mounting flange 92. As shown in FIG. 9, the mounting flange 92 is spaced rearwardly on the switch box 80 from the open front side thereof to accommodate a panel of wall finishing material as further described herein. The mounting flange 92 is provided with a plurality of apertures 94 to permit the switch box 82 to be secured to a wall stud 93 used in the construction of a wall by means of nails 94. When the switch box 80 is secured to the stud 93 in this manner, sheet rock or other suitable finishing material may be secured to the structural member in the manner illustrated by the panel 96 in FIG. 9. It will be seen that the exposed surface of this panel 96 (that is, the surface toward the inside of the room) is then positioned in substantially flush alignment with the open forward side of the switch box 80.

To facilitate the securement of a switch plate to the open forward side of the switch box 80, the switch box is formed with screw receiving bosses 98 molded on the inside surface of the top wall 88 and bottom wall 90, respectively. To accommodate the upper ends of the screws used for securement of the switch plate, to provide enhanced mechanical strength to the switch box, and to effect a saving in the total material required to construct the switch box, an elongated indentation 100 is formed in both the top wall 88 and the bottom wall 90 in alignment with the screw-receiving bosses 98 which are molded adjacent the open front side of the switch box on these walls.

An important feature of the present invention is the provision of pry-out or knock-out panel assemblies in the switch box 80 in a location and orientation with respect to the sides and walls thereof which greatly facilitates the use of the switch box, and permits it to be molded by a straight draw molding process. In the illustrated embodiment of the switch box, the pry-out panel assemblies are provided at the intersection between the back wall 82 with the top and bottom walls 88 and 90, respectively. Four of the pry-out panel assemblies are provided, with the assemblies 102 and 104 being disposed in a plane which extends at a 45° angle with respect to the top wall 88 and the back wall 82. The pry-out panel assemblies 106 and 108 occupy a plane which extends at an angle of 45° with respect to the bottom wall 90 and the back wall 82.

Each of the pry-out panel assemblies 102–108 are constructed in the manner which has been previously described in referring to the ceiling box shown in FIG. 1–5, and the manner of detachment of the pry-out tabs thereof is identical to the manner of detachment of these elements from the pry-out panel assemblies which are included in the ceiling box.

Although a preferred embodiment of the invention has been herein described in order to exemplify the basic principles underlying this invention, it is to be understood that various changes and innovations can be made in the structure described and depicted herein without departure from these basic principles. All changes and innovations of this type are therefore deemed to be circumscribed by the spirit and scope of this invention except as the same may be necessarily limited by the appended claims or reasonable equivalents thereof.

What is claimed is:

1. An electrical box comprising a unitary synthetic resin housing including:
    a plurality of first walls integrally formed and interconnected at edges to form a structure extending continuously around the interior of the housing;
    an additional wall extending substantially normal to, and formed integrally with, said first walls; and
    at least one pry-out panel assembly interconnecting an edge of said additional wall with an adjacent edge of one of said first walls, each of said pry-out panel assemblies being integrally formed with the walls interconnected thereby, and lying in a plane extending at an acute angle to the walls interconnected thereby, each of said pry-out assemblies comprising:
    a pair of triangularly cross-sectioned ribs disposed on opposite sides of a slot in the housing, each of said ribs having a base side facing the interior of the housing and lying in a common plane extending at an acute angle to the walls interconnected by the respective pry-out assembly in which the ribs are disposed; and
    a frangible bridge web interconnecting at least one of said triangularly cross-sectioned ribs with one of said walls of the housing.

2. An electrical box as defined in claim 1 wherein said housing is a right parallelepiped in configuration and is open at its side opposite said additional wall.

3. An electrical box as defined in claim 2 and further characterized as including an elongated indentation in each of said first walls extending substantially normal to said additional wall.

4. An electrical box as defined in claim 3 and further characterized as including a pair of screw-receiving bosses adjacent parallel edges of two of said first walls on the opposite side of said housing from said additional wall, said bosses each forming an end of one of said elongated indentations.

5. An electrical box as defined in claim 4 and further characterized as including pry-out panel assemblies located on opposite sides of each of said indentations and interconnecting the first wall in which the respective indentation is located and said additional wall.

6. An electrical box as defined in claim 5 and further characterized as including a mounting flange projecting from said housing in a plane extending normal to one of said first walls and spaced from the open side of said housing.

7. An electrical box as defined in claim 6 wherein each of said pry-out panel assemblies extends at an angle of substantially 45° to said additional wall and one of said first walls.

8. An electrical box as defined in claim 7 wherein said housing and mounting flange are integrally molded polyvinyl chloride resin.

9. An electrical box as defined in claim 1 and further characterized to include a mounting flange projecting from said housing in a plane extending substantially normal to one of said first walls.

10. An electrical box as defined in claim 1 and further characterized to include a pair of screw-receiving bosses adjacent parallel edges of two of said first walls and formed integrally with said two first walls on the opposite side of said housing from said additional wall.

11. An electrical box as defined in claim 1 and further characterized as including a hanger bracket on said additional wall for hanging said box from an elongated supporting member.

12. In an electrical box of the type having at least one substantially monoplannar wall which extends normal to a second substantially monoplanar wall, the improvement which comprises a pry-out panel assembly extending between said walls at an angle of from about 30° to about 60° to each of said walls, said pry-out panel assembly comprising:
    a pair of substantially parallel ribs disposed on opposite sides of a slot in the electrical box, each of said ribs having a right triangular cross-sectional configuration with the base sides of the triangle lying in a common plane extending at an angle of between 30° and 60° to said walls, and one of the remaining sides of each triangle extending substantially perpendicular to one of said walls of the box and perpendicular to the remainder of the sides of the triangle; and a bridge web interconnecting at least one of said ribs with one of said walls of the box.

13. The improvement in an electrical box as defined in claim 12 and further characterized as including two additional spaced, triangularly cross-sectioned ribs interconnecting the ribs in said first mentioned pair of ribs and disposed on opposite sides of said slot.

14. The improvement defined in claim 12 wherein said base sides of the triangles defined by the cross-section of the ribs in said pair lie in a common plane which extends at an angle of 45° to said walls.

15. The improvement defined in claim 14 and further characterized as including two additional spaced, triangularly cross-sectioned ribs interconnecting the ribs in said first mentioned pair of ribs and disposed on opposite sides of said slot.

* * * * *